United States Patent [19]

Kaneko et al.

[11] Patent Number: 4,938,574

[45] Date of Patent: Jul. 3, 1990

[54] METHOD AND APPARATUS FOR DRIVING FERROELECTRIC LIQUID CRYSTAL OPTICAL MODULATION DEVICE FOR PROVIDING A GRADIATIONAL DISPLAY

[75] Inventors: Shuzo Kaneko, Suginami; Tsutomu Toyono, Yokohama; Tadashi Yamamoto, Kawasaki; Masahiko Enari, Yokohama; Mitsutoshi Kuno, Tokyo, all of Japan

[73] Assignee: Canon Kabushiki Kaisha, Tokyo, Japan

[21] Appl. No.: 85,866

[22] Filed: Aug. 17, 1987

[30] Foreign Application Priority Data

| | | | |
|---|---|---|---|
| Aug. 18, 1986 | [JP] | Japan | 61-192571 |
| Aug. 18, 1986 | [JP] | Japan | 61-192588 |
| Aug. 29, 1986 | [JP] | Japan | 61-204932 |
| Sep. 1, 1986 | [JP] | Japan | 61-206567 |

[51] Int. Cl.[5] .......... G02F 1/13; G09G 3/00

[52] U.S. Cl. .......... 350/350 S; 350/333; 340/784

[58] Field of Search .......... 350/350 S, 332, 333; 340/784, 805

[56] References Cited

U.S. PATENT DOCUMENTS

| | | | |
|---|---|---|---|
| 4,571,585 | 2/1986 | Stein et al. | 340/784 |
| 4,591,886 | 5/1986 | Umeda et al. | 350/350 S |
| 4,600,274 | 7/1986 | Morozumi | 350/333 |
| 4,638,310 | 1/1987 | Ayliffe | 350/333 |
| 4,655,561 | 4/1987 | Kanbe et al. | 350/350 S |
| 4,705,345 | 11/1987 | Ayliffe et al. | 350/350 S |
| 4,709,995 | 12/1987 | Kuribayashi et al. | 350/333 |
| 4,712,872 | 12/1987 | Kanbe et al. | 350/350 S |
| 4,725,129 | 2/1988 | Kondo et al. | 350/350 S |
| 4,738,515 | 4/1988 | Okada et al. | 350/350 S |
| 4,800,382 | 1/1989 | Okada et al. | 340/784 |

FOREIGN PATENT DOCUMENTS

| | | |
|---|---|---|
| 0229647 | 7/1987 | European Pat. Off. . |
| 2146473 | 4/1985 | United Kingdom . |
| 2164776 | 3/1986 | United Kingdom . |

*Primary Examiner*—Stanley D. Miller
*Assistant Examiner*—Tai V. Duong
*Attorney, Agent, or Firm*—Fitzpatrick, Cella, Harper & Scinto

[57] ABSTRACT

An optical modulation device, such as a ferroelectric liquid crystal device, comprises a matrix of pixels arranged in a plurality of rows and a plurality of columns, pixels on each row being electrically connected to a scanning electrode and pixels on each column being electrically connected to a signal electrode. The optical modulation device is driven by a method comprising, in a scanning selection period applying a scanning selection signal to a selected scanning electrode, the scanning selection signal comprising plural voltage levels including a maximum value $|Vs.max|$ in terms of an absolute value with respect to the voltage level of a non-selected scanning electrode, and applying in phase with the scanning selection signal a voltage signal comprising plural voltage levels to a signal electrode so as to apply to a pixel on the selected scanning electrode plural pulse voltages including a maximum value voltage $|Vmax|$ and a minimum pulse voltage $|Vmin|$ respectively in terms of an absolute value, satisfying the relationship of:

$$|Vmax|-|Vmin|\leq|Vs.max|.$$

8 Claims, 13 Drawing Sheets

FIG.9(a)
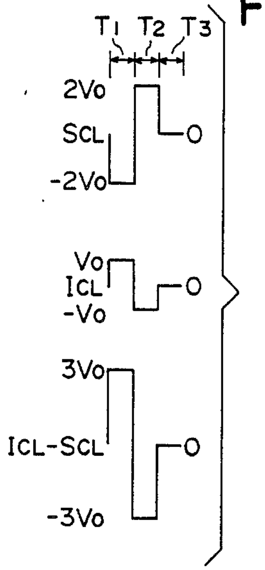
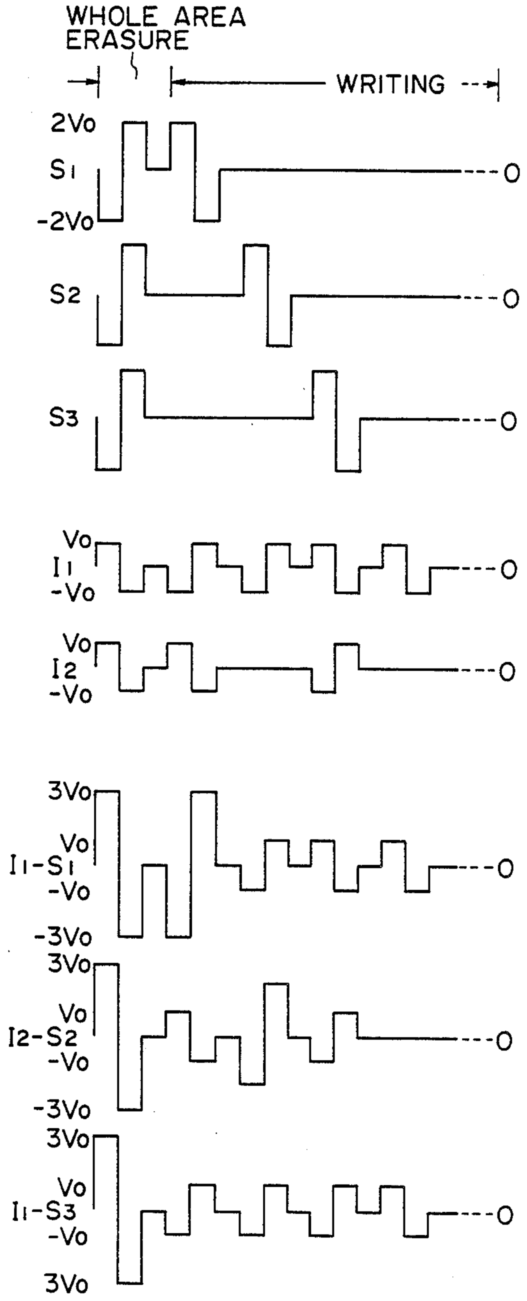
FIG. 8
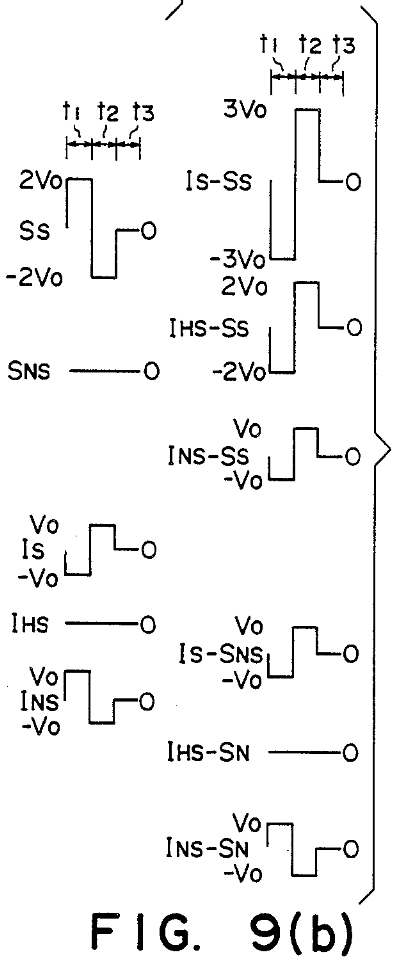
FIG. 9(b)

FIG. 11(a)
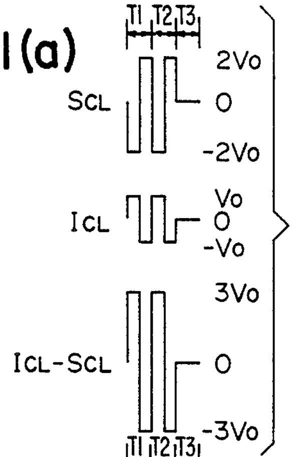
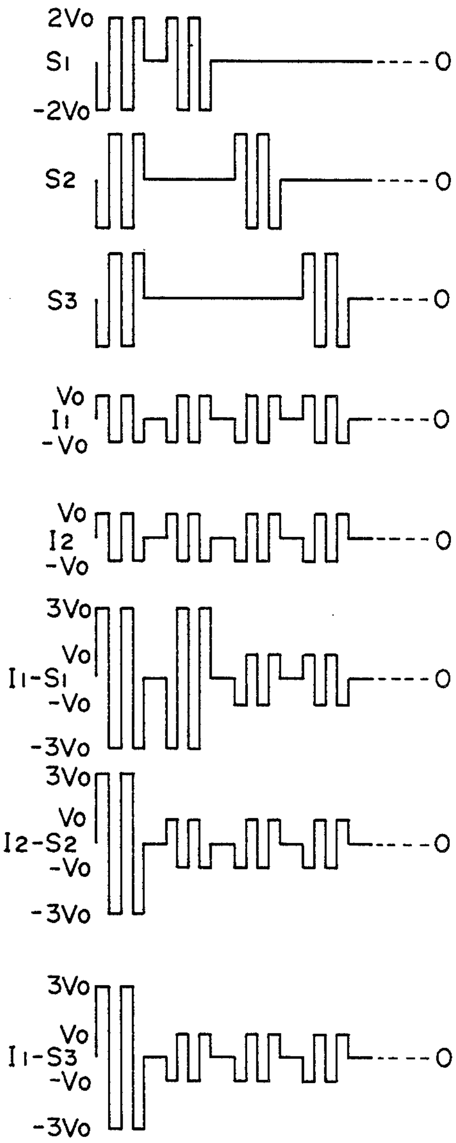
FIG. 10
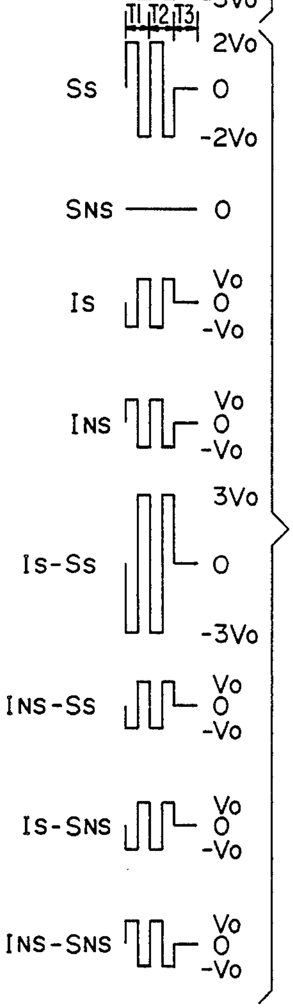
FIG. 11(b)

METHOD AND APPARATUS FOR DRIVING FERROELECTRIC LIQUID CRYSTAL OPTICAL MODULATION DEVICE FOR PROVIDING A GRADIATIONAL DISPLAY

FIELD OF THE INVENTION AND RELATED ART

The present invention relates to a method and an apparatus for driving an optical modulation device, particularly a ferroelectric liquid crystal device showing at least two stable states.

Hitherto, there is well known a type of liquid crystal device wherein scanning electrodes and signal electrodes are arranged in a matrix, and a liquid crystal compound is filled between the electrodes to form a large number of pixels for displaying images or information. As a method for driving such a display device, a time-division or multiplex driving system wherein an address signal is sequentially and periodically applied to the scanning electrodes selectively while prescribed signals are selectively applied to the signal electrodes in a parallel manner in phase with the address signal, has been adopted.

Most of the liquid crystals which have been put into commercial use as such display devices are TN (twisted nematic) type liquid crystals, as described in "Voltage-Dependent Optical Activity of a Twisted Nematic Liquid Crystal" by M. Schadt and W. Helfrich, Applied Physics Letters, Vol. 18, No. 4 (Feb. 15, 1971) pp. 127–128.

In recent years, as an improvement on such conventional liquid crystal devices, the use of a liquid crystal device showing bistability has been proposed by Clark and Lagerwall in Japanese Laid-Open Patent Application No. 107216/1981, U.S. Pat. No. 4,367,924, etc. As bistable liquid crystals, ferroelectric liquid crystals showing chiral smectic C phase (SmC*) or H phase (SmH*) are generally used. These liquid crystal materials have bistability, i.e., a property of assuming either a first stable state or a second stable state and retaining the resultant state when the electric field is not applied, and of a high response speed in response to a change in electric field, so that they are expected to be widely used in the field of a high speed and memory type display apparatus, etc.

The above type of ferroelectric liquid crystal device may be driven, for example, by multiplexing driving methods as disclosed by U.S. Pat. No. 4,548,476 issued to Kaneko and U.S. Pat. No. 4,655,561 issued to Kanbe et al.

However, this ferroelectric liquid crystal device may still cause a problem, when the number of pixels is extremely large and a high speed driving is required, as clarified in U.S. Pat. No. 4,655,561. More specifically, if a threshold voltage required for providing a first stable state for a predetermined voltage application time is designated by $-V_{th1}$ and one for providing a second stable state by $V_{th2}$ respectively for a ferroelectric liquid crystal cell having bistability, a display state (e.g., "white") written in a pixel can be inverted to the other display state (e.g., "black") when a voltage is continuously applied to the pixel for a long period of time.

FIG. 18 shows threshold characteristics of a bistable ferroelectric liquid crystal cell. More specifically, FIG. 18 shows the dependency of a threshold voltage ($V_{th}$) required for switching of display states on voltage application time when HOBACPC (showing the characteristic curve 181 in the figure) and DOBAMBC (showing curve 182) are respectively used as a ferroelectric liquid crystal.

As apparent from FIG. 18, the threshold voltage $V_{th}$ has a dependency on the application time, and the dependency is more marked or sharper as the application time becomes shorter. As will be understood from this fact, in case where the ferroelectric liquid crystal cell is applied to a device which comprises numerous scanning lines and is driven at a high speed, there is a possibility that even if a display state (e.g., bright state) has been given to a pixel at the time of scanning thereof, the display state is inverted to the other state (e.g., dark state) before the completion of the scanning of one whole picture area or frame when an information signal below $V_{th}$ is continually applied to the pixel during the scanning of subsequent lines. Further, when the device is driven for a long period of time, accumulation of DC component can cause a similar problem as described above.

SUMMARY OF THE INVENTION

An object of the present invention is to provide improved multiplexing driving method and apparatus for an optical modulation device such as a ferroelectric liquid crystal device wherein a contrast is discriminated depending on an applied electric field.

Another object of the present invention is to provide a method and an apparatus for driving an optical modulation device suited for providing a gradational display.

A further object of the present invention is to provide a method and an apparatus for driving an optical modulation device for removing flickering on a display picture.

According to the present invention, there is provided a driving method for an optical modulation device comprising a matrix of pixels arranged in a plurality of rows and a plurality of columns, pixels on each row being electrically connected to a scanning electrode and pixels on each column being electrically connected to a signal electrodes; the driving method comprising, in a scanning selection period; applying a scanning selection signal to a selected scanning electrode, the scanning selection signal comprising plural voltage levels including a maximum value $|Vs{\cdot}max|$ in terms of an absolute value with respect to the voltage level of a non-selected scanning electrodes; and applying in phase with the scanning selection signal a voltage signal comprising plural voltage levels to a signal electrodes so as to apply to a pixel on the selected scanning electrode plural pulse voltages including a maximum pulse voltage $|Vmax.|$ and a minimum pulse voltage $|Vmin|$ respectively in terms of an absolute value, satisfying the relationship of:

$$|Vmax| - |Vmin| \leqq |Vs{\cdot}max|$$

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 8, 9(*a*), 9(*b*), 10, 11(*a*), 11(*b*), 12, 13(*a*), 13(*b*), 14(*a*), 14(*b*), 15(*a*) and 15(*b*) are voltage waveform charts representing driving examples according to the present invention.

DESCRIPTION OF PREFERRED EMBODIMENTS

Figure 1:
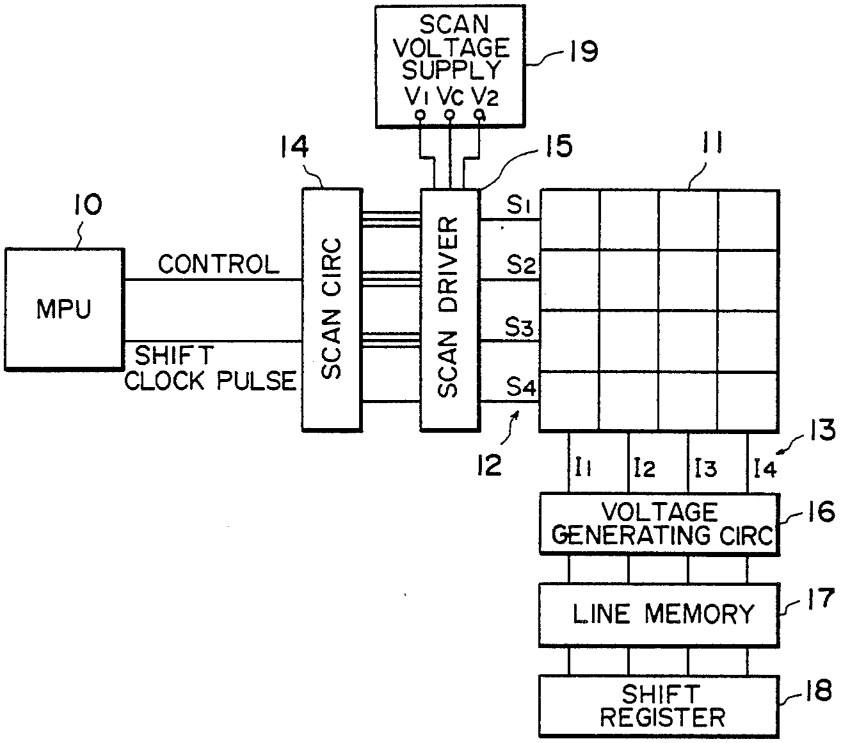
FIG. 1 is a block diagram of an embodiment of the apparatus according to the present invention including a ferroelectric liquid crystal device.

FIG. 1 illustrates a driving apparatus for a ferroelectric liquid crystal panel 11 provided with a matrix electrode arrangement used in the present invention. The panel 11 is provided with scanning lines 12 and data lines 13 intersecting with each other, and a ferroelectric liquid crystal disposed at each intersection between the scanning lines 12 and data lines 13. In addition to the panel, the driving apparatus includes a scanning circuit 14, a scanning side driver circuit 15, a signal side driving voltage generating circuit 16, a line memory 17, a shift register 18, a scanning side driving voltage supply 19, and a microprocessor unit (MPU) 10.

The scanning side driving voltage supply 19 supplies voltages $V_1$, $V_2$ and $V_c$, of which voltages $V_1$ and $V_2$ for example are supplied as sources of scanning selection signals and voltage $V_c$ is supplied as a source of scanning nonselection signal.

Figure 2:
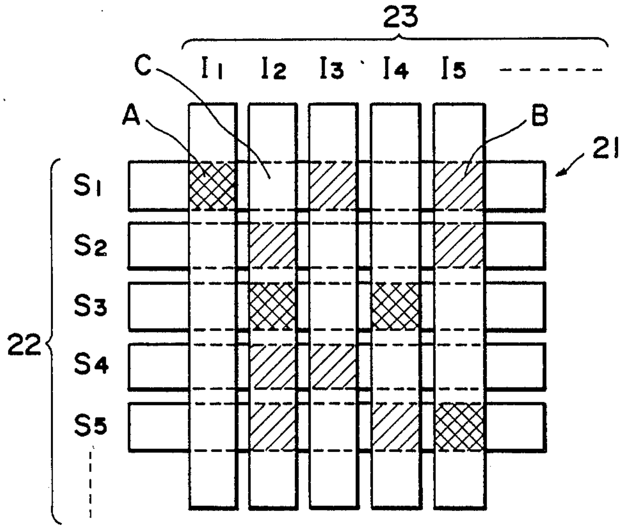
FIG. 2 is a plan view of a matrix electrode arrangement used in the present invention.

FIG. 2 is a schematic plan view of a representative ferroelectric liquid crystal cell 21 having a matrix pixel arrangement comprising a bistable ferroelectric liquid crystal disposed between scanning electrodes 22 and signal electrodes 23. The present invention is applicable to a multi-level or analog gradational display, but for brevity of explanation, a case wherein three levels of "white", one intermediate level and "black" are displayed will be explained. In FIG. 2, the crosshatched pixels are assumed to be displayed in "black"; the unidirectionally hatched pixels, in the intermediate level; and the other pixels; in "white".

Figure 3A:
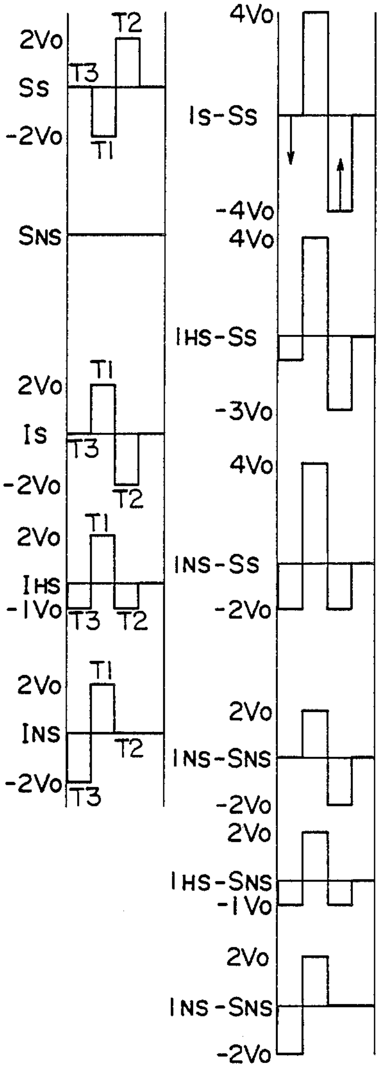
FIGS. 3(*a*), 3(*b*), 4(*a*), 4(*b*), 5(*a*), and 5(*b*) are voltage waveform charts representing driving examples according to the present invention.
Figure 3B:
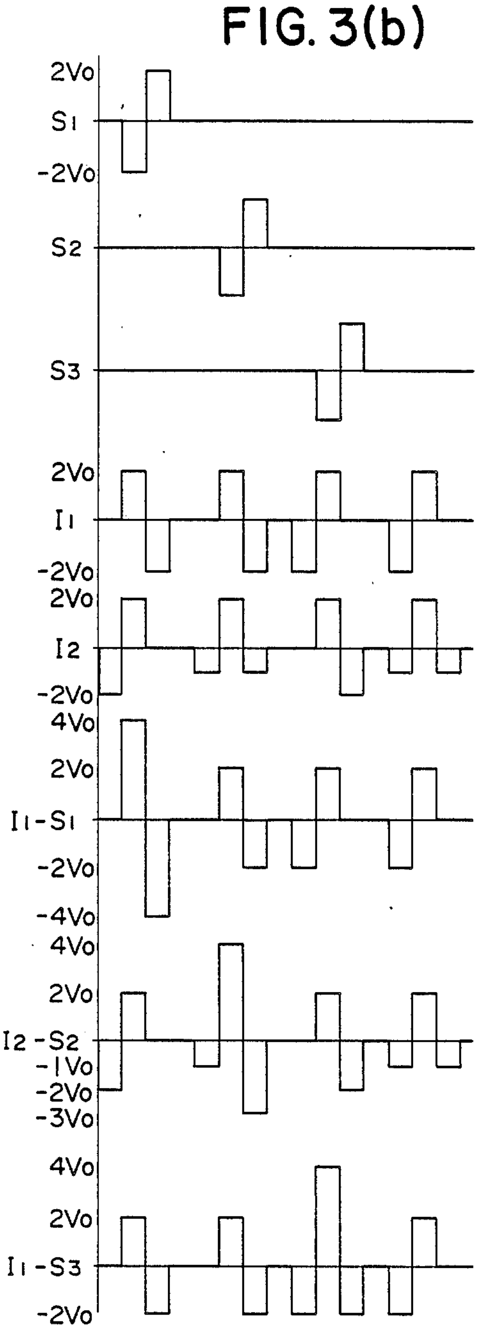

FIGS. 3(*a*) and 3(*b*) disclose a driving method for an optical modulation device of the type as described above, which comprises: applying to a selected scanning electrode a scanning selection signal comprising a voltage of one polarity and a voltage of the other polarity respectively with respect to the voltage level of a nonselected scanning electrode, and also a same level voltage which is at the same voltage level as that of the non-selected scanning electrode;

applying to a selected signal electrodes an information signal comprising a first voltage signal providing a voltage exceeding the first threshold voltage of the optical modulation material in synchronism with the voltage of one polarity, a second voltage signal providing a voltage exceeding the second threshold voltage of the optical modulation material, and a third voltage signal which provides a voltage not exceeding the first or second threshold voltage in synchronism with the same level voltage and is a voltage signal of 0 or the same polarity as the second voltage signal each with respect to the voltage level of the nonselected scanning electrode; and applying to another signal electrodes an information signal comprising a fourth voltage signal providing a voltage exceeding the first threshold voltage of the optical modulation material in synchronism with the voltage of one polarity, a fifth voltage signal providing a voltage not exceeding the first or second threshold voltage of the optical modulation material in synchronism with the voltage of the other polarity, and a sixth voltage signal providing, in synchronism with the same level voltage, a voltage which does not exceed the first or second threshold voltage of the optical modulation material and has the same polarity as the voltage when the fifth voltage signal is applied.

More specifically, FIGS. 3(*a*) and 3(*b*) show an exemplary set of driving waveforms for effecting image-erasure and writing sequentially and line by line, and the resultant picture corresponds to one shown in FIG. 2.

FIG. 3(*a*) shows voltage signal waveforms applied to respective scanning electrodes $S_S$, $S_{NS}$ and respective signal electrodes $I_S$, $I_{HS}$, $I_{NS}$, and voltages applied to the liquid crystal at respective pixels sandwiched between the scanning electrodes and signal electrodes. In the figure, the abscissa represents time and the ordinate represents voltage.

At $S_S$ is shown a driving waveform applied to a selected scanning electrode, i.e., a line on which image information is written, and at $S_{NS}$ is shown a driving waveform applied to a nonselected scanning electrode, i.e., a line on which image information is not written. Further, at $I_S$ is shown a driving waveform applied to a signal electrode on which an intersection with the selected line is to be written into "black". Similarly, at $I_{HS}$ and $I_{NS}$ are shown driving waveforms for writing an intermediate level and "white", respectively.

At this time, the liquid crystal constituting pixels is supplied with voltages shown at $I_S$–$S_S$, $I_{HS}$–$S_S$, $I_{NS}$–$S_S$, $I_S$–$S_{NS}$, $I_{NS}$–$S_{NS}$, respectively.

At this time, the driving voltage $V_0$ is selected so as to satisfy the relationship of $|\pm 2\ V_0| < |V_{th}| < |\pm 3\ V_0|$ when the threshold voltage of the bistable ferroelectric liquid crystal is denoted by $V_{th}$. In an ordinary liquid crystal cell, the inversion threshold voltage $V_{th}$ can have somewhat different values on the ⊕ side and ⊖ side. In such a case, an appropriate counter-measure may be taken, for example, the driving potential level may be slightly corrected on the ⊕ and ⊖ sides in respective driving waveforms. Herein, however, the magnitudes of the inversion threshold voltages on the ⊕ side $|V_{th}|$ and the ⊖ side $|-V_{th}|$ are assumed to be the same (i.e., $|+V_{th}| = |-V_{th}|$).

In such a case, when the voltage applied across a pixel is e.g., 2 $V_0$ or less in terms of an absolute value or magnitude, no inversion of the liquid crystal is caused at the pixel. On the other hand, when the voltage is 3 $V_0$ or above, the inversion is caused and the degree of the inversion is intensified as the absolute value increases.

The respective waveforms will be explained in more detail. A scanning selection signal $S_S$ applied to a selected scanning electrode comprises four phases in one writing period, among which line-erasure is effected at the second phase, and writing into pixels is effected depending on signals applied to signal electrodes at the third phase. For this purpose, pulse voltages of $-2\ V_0$ and $+2\ V_0$ are applied at the second and third phases, respectively. Further, at the first phase and the fourth phase, a voltage of substantially 0 (a reference potential) is supplementally applied. On the other hand, a scanning nonselection signal applied to a non-selected scanning electrode is fixed at the reference potential, 0 V in thin embodiment.

Then, with respect to the voltage waveforms applied to the signal electrodes in substantial synchronism with the respective phases of the scanning selection signal, an erasure signal of $+2\ V_0$ is applied at the second phase wherein a voltage of $+4\ V_0$ exceeding the inversion threshold voltage of the liquid crystal is applied between the selected scanning electrode $S_S$ and the respective signal electrodes, so that the whole line is inverted to the erasure side (white). Next, at the third phase, the signal electrodes intersecting with the selected scanning electrode are supplied with voltage signals respectively corresponding to given gradation data. Herein, it is assumed that a potential or voltage signal of $-2\ V_0$ is applied for providing "black" to a pixel formed at such an intersection, a potential of $-V_0$ is applied for providing an intermediate level ("gray") and a potential of the same level as the scanning nonselection signal is applied for retaining "white" as it is. As a result, the voltages of $-4\ V_0$, $-3\ V_0$ and $-2\ V_0$, respectively, are applied to the pixels on the line, which are written into "black", "grey" (intermediate level) and "white", respectively.

Then, the supplemental or auxiliary first and fourth phases are explained. At the fourth phase, a voltage or potential of 0 (reference potential) which is the same as the voltage level of the scanning non-selection signal is applied to the signal electrodes, so that a voltage of 0 is applied to the pixels on the line. At the first phase, a voltage signal corresponding to the one applied at the above-mentioned third phase is applied. More specifically, the voltage signal applied to a selected signal electrode at the first phase is one at the same level as that of the scanning nonselection signal, or is a voltage signal which is of the same polarity as the voltage signal applied at the third phase and provides a voltage not exceeding the threshold voltage of the ferroelectric liquid crystal. Further, at this time, it is preferred that the sum of the voltages applied at the first and third phases is constant for all the pixels on the selected scanning electrode in order to remove flickering on a displayed picture.

The embodiment shown above is further characterized in that a voltage of the same polarity is not applied continually for two or more phases.

As is understood from FIG. 3(*b*), the voltage signals applied to the scanning electrodes and signal electrodes are of such character that any adjacent pair of voltage levels selected from each signal forms a combination of 0 and 0, 0 and one polarity, or mutually opposite polarities, so that any pixel is not successively supplied with a voltage of the same polarity.

Further, as the voltage applied to a pixel is constant at almost zero, so that the voltage applied at the fourth phase does not cause a crosstalk against the voltage applied at the third phase which determines a pixel state. As a result, a good and stable gradational display can be effected. It is possible to apply the voltage of the fourth phase at the first phase alternatively. Further, it is of course possible to apply the above embodiment to a binary level display by selecting only two levels of voltages corresponding to "white" and "black".

In the above explanation, a display of three level image has been explained. However, a multi-level or analog gradation image can be obtained by changing the voltage levels of voltage signals applied to signal electrodes at the third phase from $-2\ V_0$ to zero and corresponding changing the voltage levels of voltage signals applied to signal electrodes at the first phase from zero to $-2\ V_0$, respectively, in multi-levels on continuously.

FIGS. 4(*a*), 4(*b*), 5(*a*) and 5(*b*) disclose a driving method for an optical modulation device, which comprises:

applying a scanning selection signal to a selected scanning electrode, the scanning selection signal comprising plural voltage levels including a maximum value $|Vs\cdot max|$ in terms of an absolute value with respect to the voltage level of a non-selected scanning electrode; and applying in phase with the scanning selection signal a voltage signal comprising plural voltage levels to a signal electrode so as to apply to a pixel on the selected scanning electrode plural pulse voltages including a maximum pulse voltage $|Vmax|$ and a minimum pulse voltage $|Vmin|$ respectively in terms of an absolute value, satisfying the relationship of:

$$|Vmax| - |Vmin| \leq |Vs\cdot max|,$$

preferably, further $\frac{1}{2}|Vs\cdot max| \leq |Vmax| - |Vmin|$.

More specifically, FIG. 4 shows an exemplary set of driving waveforms for effecting image-erasure and writing sequentially and line by line, and the resultant picture corresponds to one shown in FIG. 2.

FIG. 4(*a*) shows voltage signal waveforms applied to respective scanning electrodes $S_S$, $S_{NS}$ and respective signal electrodes $I_S$, $I_{HS}$, $I_{NS}$ and voltages applied to the liquid crystal at respective pixels sandwiched between the scanning electrodes and signal electrode. In the figure, the abscissa and the ordinate represent time and voltage, respectively, as in FIG. 3(*a*) and 3(*b*).

A driving waveform $S_S$ is applied to a selected scanning electrode, i.e., a line on which image information is written, and a driving waveform $S_{NS}$ is applied at that time to a nonselected scanning electrode, i.e., a line on which image information is not written. On the other hand, a driving waveform $I_S$ is applied to a signal electrode on which an intersection with the selected line is to be written into "black". Similarly, driving waveforms $I_{HS}$ and $I_{NS}$ are applied for writing an intermediate level and "white", respectively.

At this time, the liquid crystal constituting pixels is supplied with voltages shown at $S_S$-$I_S$, $S_S$-$I_{HS}$, $S_S$-$I_{NS}$, $S_{NS}$-$I_S$, $S_{NS}$-$I_{HS}$ and $S_{NS}$-$I_{NS}$, respectively.

At this time, the driving voltage $V_0$ is similarly selected to satisfy the relationship of $|\pm 2\ V_0| < |V_{th}| < |\pm 3\ V_0|$ wherein the inversion threshold voltage $V_{th}$ of the bistable ferroelectric liquid crystal used is assumed to have the same magnitude absolute value on the negative side $(+V_{th})$ and on the negative side $(-V_{th})$ as in the embodiment of FIGS. 3(*a*) and 3(*b*).

The respective waveforms will now be explained in more detail. The scanning selection signal $S_S$ applied to a selected scanning electrode comprises 4 phases in one writing period, among which line erasure is effected at the second phase and writing into pixels is effected depending on signals applied to signal electrodes at the third phase. For this purpose, pulse voltages of $-2\ V_0$ and $+2\ V_0$ are applied at the second and third phases, respectively. Further, at the first phase and the fourth phase, voltages of substantially the same magnitude as and of the opposite polarities to those applied at the second and third phases are supplementally applied. On the other hand, a scanning nonselection signal applied to a non-selected scanning electrode is fixed at the reference potential, 0 volt in this embodiment.

Then, with respect to the voltage waveforms applied to the signal electrodes in substantial synchronism with the respective phases of the scanning selection signal, an erasure signal of $+2\ V_0$ is applied at the second phase wherein a voltage of $-4\ V_0$ (calculated as $S_S-I$ as shown in FIG. 4(*a*) exceeding the inversion threshold voltage of the liquid crystal is applied between the selected scanning electrode $S_S$ and the respective signal electrodes, so that the whole line is inverted to the erasure side (white). Next, at the third phase, the signal electrodes intersecting with the selected scanning electrode are supplied with voltage signals respectively corresponding to given gradation data. Herein, it is assumed that a potential or voltage signal of $-2\ V_0$ is applied for providing "black" to a pixel formed at such an intersection, a potential of $-V_0$ is applied for providing an intermediate level ("gray") and a potential of 0 is applied for retaining "white" as it is. As a result, voltages of $+4\ V_0$, $+3\ V_0$ and $+2\ V_0$, respectively (calculated as $S_S-I$), are applied to the pixels on the line, which are written into "black", an intermediate level and "white", respectively.

With respect to the supplemental or auxiliary first and fourth phases, at the fourth phase, the pixels on the selected scanning electrode are supplied with a voltage of $-2\ V_0$ which is of the same polarity as that applied at the erasure phase and is below the threshold voltage.

At the first phase, a voltage signal corresponding to the one applied in the above-mentioned second phase is applied. More specifically, the voltage signal applied to a selected signal electrode at the first phase is of the same polarity as the voltage signal applied at the third phase with respect to the level of the scanning nonselection signal or at the same levels as that of the scanning nonselection signal. In this instance, it is preferred that the magnitudes of the voltages applied to the pixels on the selected scanning electrode at the respective phases satisfy the relationship of: $|V_1|+|V_3|=|V_2|+|V_4|$, wherein $|V_1|$, $|V_2|$, $|V_3|$ and $|V_4|$ are the magnitudes of the voltages applied at the first, second, third and fourth phases, respectively.

In this embodiment, a voltage of the same polarity is not applied continually for two or more phases.

FIGS. 5(*a*) and 5(*b*) illustrate another embodiment of the driving method according to the present invention. The embodiment shown in FIGS. 5(*a*) and 5(*b*) is different from the one shown in FIGS. 4(*a*) and 4(*b*) only in that a scanning selection signal with a different voltage level at the first phase is applied to a selected scanning electrode. As a result, similar effects as obtained in the embodiment in FIGS. 4(*a*) and 4(*b*) are attained, with respect to the effect on crosstalk caused at pixels to which the scanning selection signal is not applied for consecutive phases and the effect on stabilization of gradational display. A new characteristic feature of the embodiment of FIGS. 5(*a*) and 5(*b*) is that a voltage with a magnitude which is always below the threshold voltage $|V_{th}|$ is applied at the first phase, i.e., before the second phase wherein the line-erasure signal is applied. As a result, it becomes possible to prevent a possible flickering at pixels indicated by $S_S$-$I_{HS}$ and $S_S$-$I_{NS}$ shown in FIG. 4(*a*) which is caused as a phenomenon that some pixels on a line are once written into "black" before the line erasure because a writing voltage exceeding the threshold voltage is applied at the first phase before the line erasure step.

In the above explanation, a display of three level image has been explained. However, a multi-level or analog gradation image can be obtained by changing the voltage levels of voltage signals applied to signal electrodes at the third phase from zero to $-2\ V_0$ and correspondingly changing the voltage levels of voltage signals applied to signal electrodes at the first phase from zero to $-2\ V_0$, respectively, in multi-levels or continuously.

Figure 5A:
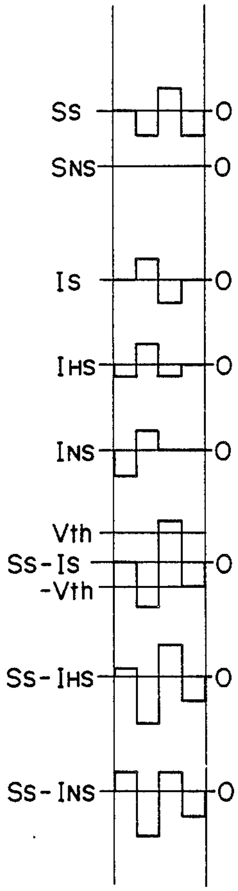
Figure 5B:
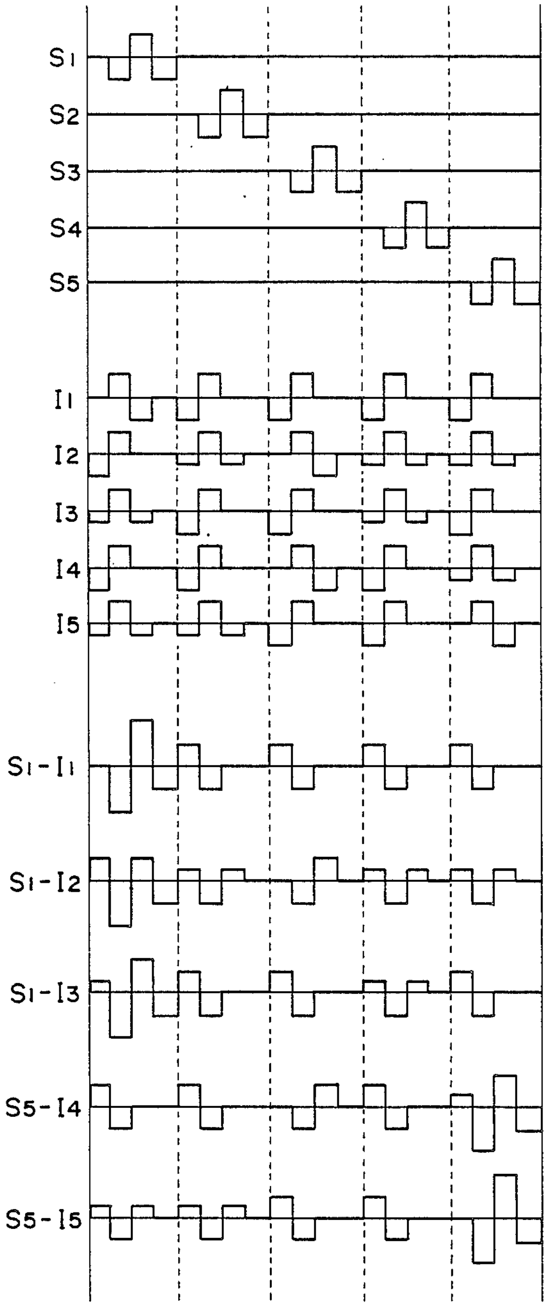
Figure 6:
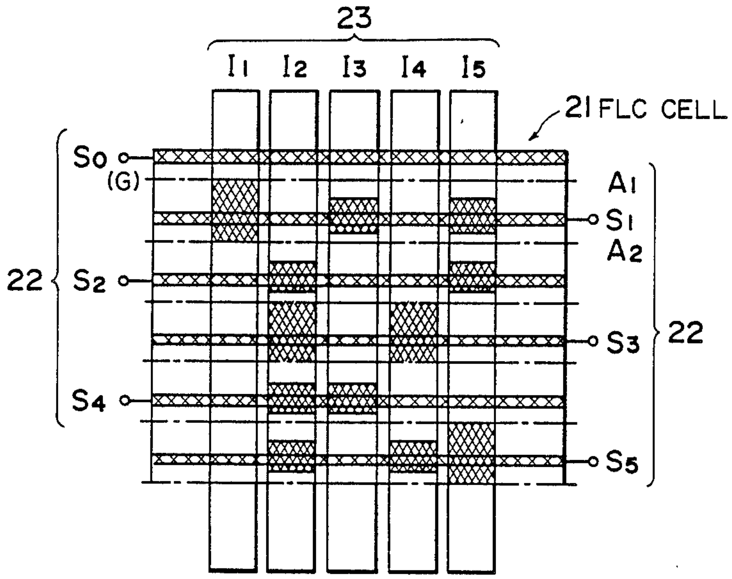
FIGS. 6 and 7 are respectively a plan view of a matrix electrode structure for gradational display.
Figure 7:
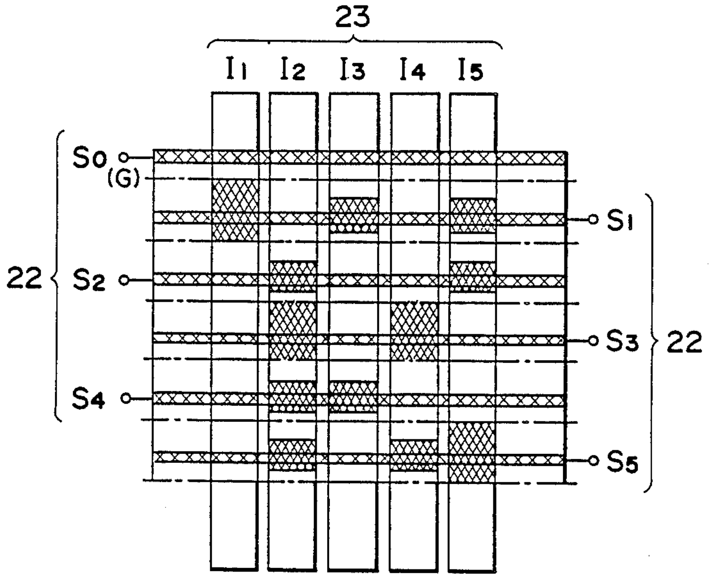

FIG. 6 shows a matrix cell comprising pixels written by application of the driving waveforms shown in FIGS. 4 or 5.

The cell 21 comprises signal electrodes $I_1$-$I_5$ composed of transparent conductor films such as those of ITO etc., low-resistivity scanning electrodes of Al, Au, etc., in the form of thin stripes connected to terminals $S_0$-$S_5$, and transparent high resistivity film portions ($10^5-10^8\ \Omega/\square$) of $SnO_2$, etc. in the form of stripes sandwiched between the low-resistivity scanning electrodes.

The above constructed scanning electrodes $S_1$-$S_5$ are supplied with the driving waveforms as shown at corresponding parts in FIG. 4(*b*) or FIG. 5(*b*) while the electrode $S_0$ is always placed at zero (reference) potential. In this arrangement, a potential gradient of $2\ V_0$ is formed between a selected scanning electrode and a non-selected scanning electrode at the time of writing a pixel. More specifically, when a scanning electrode $S_1$ is supplied with a voltage of $2\ V_0$, a potential of $V_0$ is provided at mid points toward $S_0$ and $S_2$.

On the other hand, when the signal electrodes are supplied with prescribed signal voltages, different voltages are applied to the liquid crystal depending on positions along the resistive film, so a portion of the liquid crystal supplied with a voltage exceeding the threshold is selectively written into "black". In the embodiment shown in FIG. 6, a portion including a scanning electrode and sandwiched between dot-and-dash lines corresponds to a pixel.

The operation of the matrix cell is explained in some more detail. When a scanning electrode $S_1$ is selected and the respective signal electrodes are supplied with voltage signals, the region which is erased in a line and in which "black" is written is one defined between dot-and-dash lines $A_1$ and $A_2$ which are almost equally distant from $S_1$. Thus, the region is once uniformly erased into "white". Then, if the voltage signal is for writing "black", almost the entirety of this region with the scanning electrode $S_1$ as the center is written into "black"; if the signal is for writing an intermediate level, the region is partially written into "black"; and if the signal is for writing "white"; the region is retained in "white" as it is. Then, when a scanning electrode $S_2$ is selected, a region between lines $A_2$ and $B_2$ is wholly erased into white. Thereafter, if the region, "black", an intermediate level and "white" are determined. Accordingly, by sequentially selecting the scanning electrodes, an image as shown in FIG. 6 is formed.

On the other hand, if the maximum voltage in terms of the absolute voltage applied to pixels is appropriately selected, pixels may be formed to be spaced apart at mid parts between adjacent scanning electrodes. More specifically, this is accomplished by setting the maximum voltage value applied to the liquid crystal to a value which is larger than the threshold level in terms of the absolute value by nearly $|V_0|$ if it is assumed that the potential gradient of 2 $V_0$ in terms of the absolute value is formed a selected scanning electrode and a non-selected scanning electrode as shown in FIGS. 4(*a*), 4(*b*), 5(*a*) and 5(*b*). In other words, it is sufficient to conduct a gradational display by using voltages within about a half of the magnitude of the potential gradient. As a result, in the embodiment of FIGS. 4 and 5, the maximum value may be taken between $|\pm 3\ V_0|$ and $|\pm 4\ V_0|$. In this instance, the voltage value for making the whole pixel "black" and the voltage value for making the whole pixel "white" can be different in some cases. In such a case, these voltage values may be different to an appropriate extent to effect a correction.

Further, in this instance, scanning need be effected sequentially for each scanning line but can be effected sequentially for every other scanning line. Another scanning sequence may also be possible.

FIGS. 8, 9(*a*), 9(*b*), 10, 11(*a*), 11(*b*), and 12 disclose a driving method for an optical modulation device, which comprises: in a first step, applying a voltage exceeding the first threshold voltage of the optical modulation material to the pixels on all or a prescribed number of the scanning electrodes or the pixels on a selected scanning electrode; and in a second step, applying to a selected scanning electrode a scanning selection signal comprising a voltage of one polarity and a voltage of the other polarity coming after the voltage of one polarity, respectively with respect to the voltage level of a nonselected scanning electrode; applying to a selected signal electrode an information signal comprising a voltage signal providing a voltage exceeding the first threshold voltage of the optical modulation material in synchronism with the voltage of one polarity and a voltage signal providing a voltage exceeding the second threshold voltage of the optical modulation material in synchronism with the voltage of the other polarity; and applying to another signal electrode an information signal comprising a voltage signal providing a voltage not exceeding the first or second threshold voltage of the optical modulation material in synchronism with the voltage of one polarity and a voltage signal providing a voltage not exceeding the first or second threshold voltage of the optical modulation material.

More specifically, FIG. 8 shows an exemplary set of driving waveforms expressed in time series used in an embodiment of the above method. FIG. 9(*a*) shows unit signal waveforms for a step for erasure of whole are or a block comprising a prescribed plural number of lines. FIG. 9(*b*) shows unit driving waveforms for writing. $S_{CL}$ in FIG. 9(*a*) denotes a signal waveform applied simultaneously or sequentially to all or a prescribed number of scanning electrodes, and $I_{CL}$ denotes a signal waveform applied to all or a prescribed number of signal electrodes. $I_{CL}$–$S_{CL}$ denotes a voltage waveform applied to pixels correspondingly.

The erasure step or period includes phases $T_1$, $T_2$ and $T_3$. The voltages applied to the pixels at phases $T_1$ and $T_2$ are of mutually opposite polarities, and the phase $T_3$ is provided as a rest phase. The voltage applied to the pixels at the rest phase may preferably be at the same level as the voltage applied to a non-selected scanning electrode in the writing step. Further, in a case where the pixels are erased for block by block each comprising a prescribed number of scanning electrodes, an erasure step and a writing step are effected sequentially for each block.

First of all, in a case of whole erasure, a voltage of $+3\ V_0$ is applied to the pixels at phase $T_1$ whereby all the pixels are uniformly brought to "black". Then, however, a voltage of $-3\ V_0$ is applied at phase $T_2$ whereby all the pixels are uniformly brought to "white". At phase $T_3$ thereafter, a constant voltage of substantially zero is applied to the pixels which therefore retain the "white" state written in the phase $T_2$.

In FIG. 9(*b*), $S_S$ denotes a scanning selection signal applied to a selected scanning electrode; $S_{NS}$, a scanning nonselection signal applied to a nonselected scanning electrode; $I_S$, an information selection signal (black signal) applied to a selected signal electrode; and $I_{NS}$, an information nonselection signal (white signal) applied to a nonselected signal electrode. Further, $I_{HS}$ denotes a gradation signal for writing an intermediate level.

The voltages applied to the liquid crystal at the respective pixels are as shown at $I_S$–$S_S$, $I_{HS}$–$S_S$, $I_{NS}$–$S_S$, $I_S$–$S_{NS}$, $I_{HS}$–$S_{NS}$ and $I_{NS}$–$S_{NS}$.

Herein, the driving voltage $V_0$ is selected to satisfy the relationship of $|\pm V_0| < |V_{th}| < |\pm 2\ V_0|$, wherein the inversion threshold voltage $V_{th}$ of the bistable ferroelectric liquid crystal used is assumed to have the same magnitude or absolute value on the negative side ($+V_{th}$) and on the negative side ($-V_{th}$) as in the embodiment of FIG. 3.

If the driving voltage is defined as above, when the voltages applied across a pixel is, e.g., $V_0$ or less in terms of an absolute value, no inversion of the liquid crystal is caused at the pixel. On the other hand, when the voltage is 2 $V_0$ or above, the inversion is caused and the degree thereof is intensified as the absolute value increases.

After the above-mentioned erasure step, image information is provided line by line. More specifically, a selected scanning electrode is supplied with a driving waveform comprising $+2\ V_0$ at phase $t_1$, $-2\ V_0$ at phase $t_2$ and substantially zero at phase $t_3$. On the other hand, a non-selected scanning electrode is held at substantially zero (reference potential) throughout the phases $t_1$, $t_2$ and $t_3$.

The respective signal electrodes are supplied with a signal for determining a pixel state at phase $t_2$, an auxiliary signal at phase $t_1$ which has the same magnitude as and the opposite polarity to the signal applied at phase $t_2$, and a constant signal with substantially zero potential at phase $t_3$. More specifically, a signal $I_S$ for writing "black" has $+V_0$ at phase $t_2$ and $-V_0$ at phase $t_1$. A signal $I_{HS}$ for writing an intermediate level has zero potential at phase $t_2$ and also at phase $t_1$. Further, a signal $I_{NS}$ for retaining "white" has $-V_0$ at phase $t_2$ and $+V_0$ at phase $t_1$.

As a result, corresponding to the signals applied to signal electrodes, the respective pixels are supplied with voltage waveforms shown at $I_S$–$S_S$, $I_{HS}$–$S_S$ and $I_{NS}$–$S_S$, and therefore at phase $t_2$, a voltage of $+3\ V_0$ for writing "black", $+2\ V_0$ for writing intermediate level, and $+V_0$ for retaining "white", respectively. Thus, the respective states of the pixels are determined. On the other hand, the pixels on a non-selected scanning electrode are supplied with voltage waveforms $I_S$–$S_{NS}$, $I_{HS}$–$S_{NS}$ and $I_{NS}$–$S_{NS}$ which are the same as $I_S$, $I_{HS}$ and $I_{NS}$, to retain their written states. Further, at phase $t_3$, all the pixels are supplied with zero voltage.

FIGS. 10 and 11(*a*) and 11(*b*) show another driving embodiment of the present invention. FIG. 11(*a*) shows driving waveforms for an erasure step. FIG. 11(*b*)

shows driving waveforms for a writing step. The respective symbols used in these figures have the same meanings as used in FIGS. 8(*a*) and 9(*b*). The driving waveforms shown in FIG. 11(*a*) and 11(*b*) have two sets of phases $t_1$ and $t_2$ and $t_3$ used in FIGS. 9(*a*) and 9(*b*). Alternatively, driving waveforms having three or more sets of phase $t_1$ and $t_2$ and $t_3$ may be used. FIGS. 11(*a*) and 11(*b*) show driving waveforms shown in FIG. 10 applied in time series.

In the embodiment shown in FIGS. 10, 11(*a*) and 11(*b*), the signal electrodes are supplied with signal waveforms which assume a constant potential (zero potential) at phase $t_3$, whereby even when a certain pixel is continuously placed on a nonselected scanning electrode, the pixel is not supplied with a voltage of the same polarity for successive phases because a phase of zero voltage is always provided between adjacent voltages of the same polarity, and a voltage at phase $t_2$ has a voltage of the opposite polarity or zero at phases $t_1$ and $t_3$ on both sides thereof. Furthermore, as the driving waveforms are so constituted that the pixels are supplied with voltages the total of which assume almost zero at least during the period of no selection, the problem of crosstalk can be completely solved. The pixels on a selected scanning electrode are supplied with a constant voltage of substantially zero at phase $t_3$, so that the voltage at phase $t_3$ does not provide a cause of crosstalk against the voltage applied at the previous phase, i.e., a pixel state-determining phase $t_2$. As a result, good and stable gradational display can be accomplished.

Further, in the above embodiment, the auxiliary signal applied at phase $t_1$ has a voltage which has the same magnitude as and the opposite polarity to the voltage applied at the pixel state-determining phase $t_2$, so that the auxiliary signal can be easily provided by inverting the level signal for writing a pixel applied at the phase $t_2$ by means of an analog or digital inverter. As a result, the electrical circuit for driving can be simply constituted and does not require a complicated arithmetic circuit.

In the above explanation, a display of three level image has been explained. However, a multi-level or analog gradation image can be obtained by changing the voltage levels of voltage signals applied to signal electrodes at the second phase $t_2$ from $+V_0$ to $-V_0$ and correspondingly changing the voltage levels of voltage signals applied to signal electrodes at the first phase from $-V_0$ to $+V_0$, respectively, in multi-levels or continuously.

Further, it is also possible to modify the above embodiment by applying the constant signal of substantially zero applied at phase $t_3$ in the above embodiment at phase $t_1$, applying the auxiliary signal at phase $t_2$, and applying the pixel state-determining signal at phase $t_3$.

Figure 12:
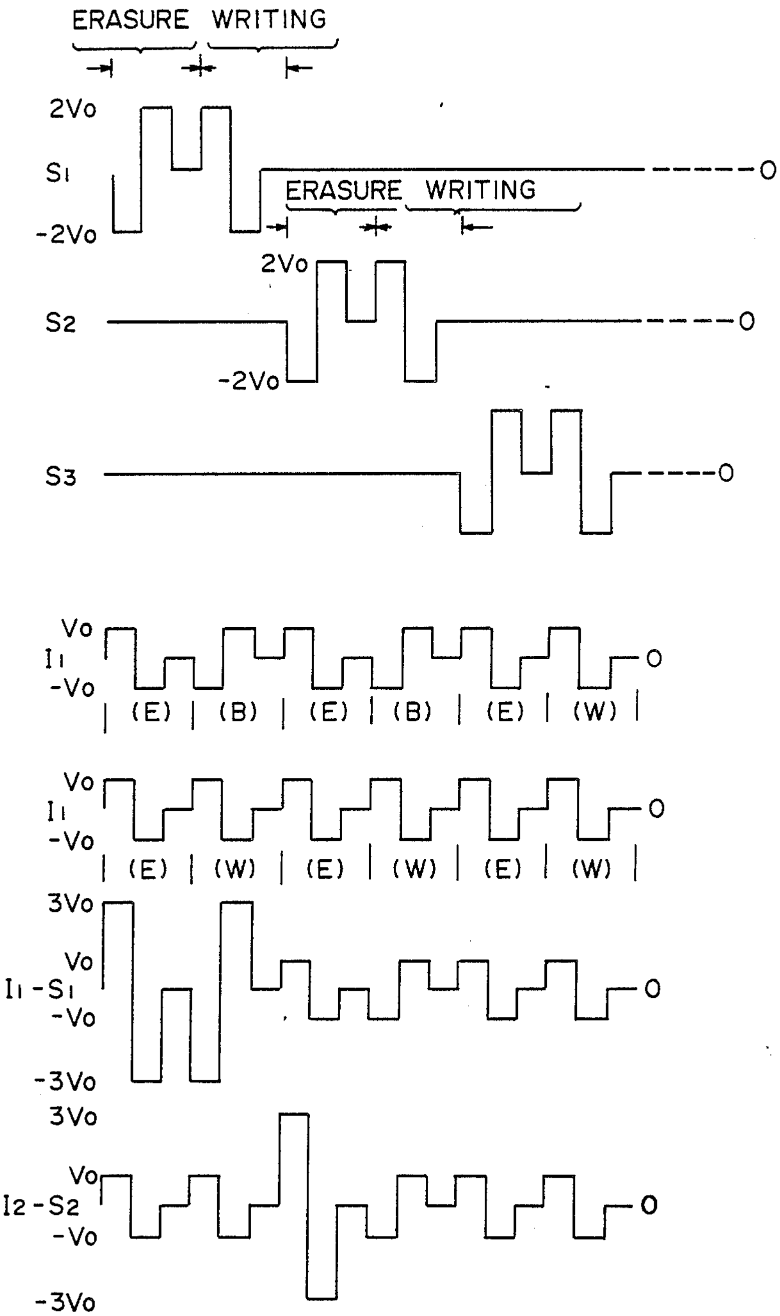

FIG. 12 shows another exemplary set of driving waveforms. In the embodiment shown in FIG. 12, an erasure step (E) and a writing step (B or W) is provided for each line and the two steps are applied line by line to effect a display.

Figure 13A:
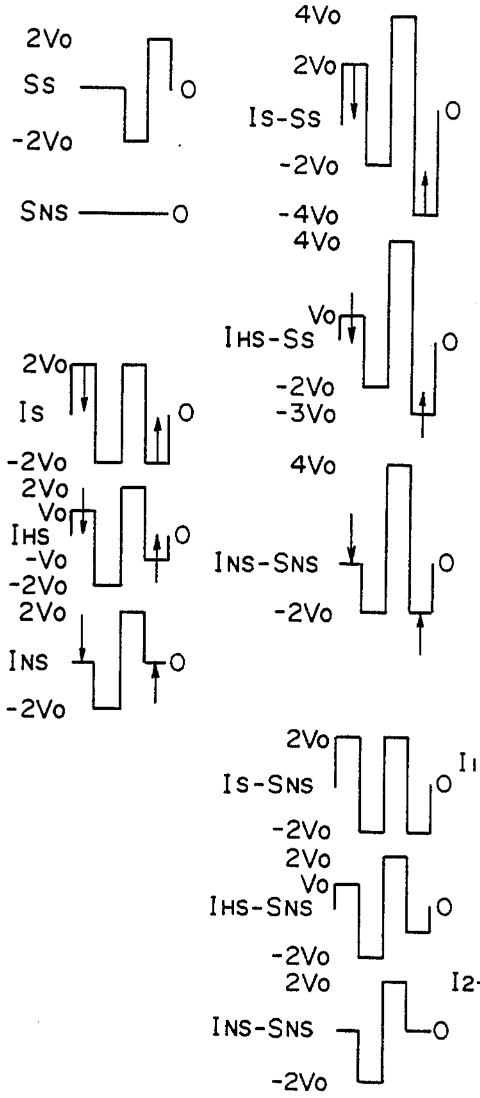
Figure 13B:
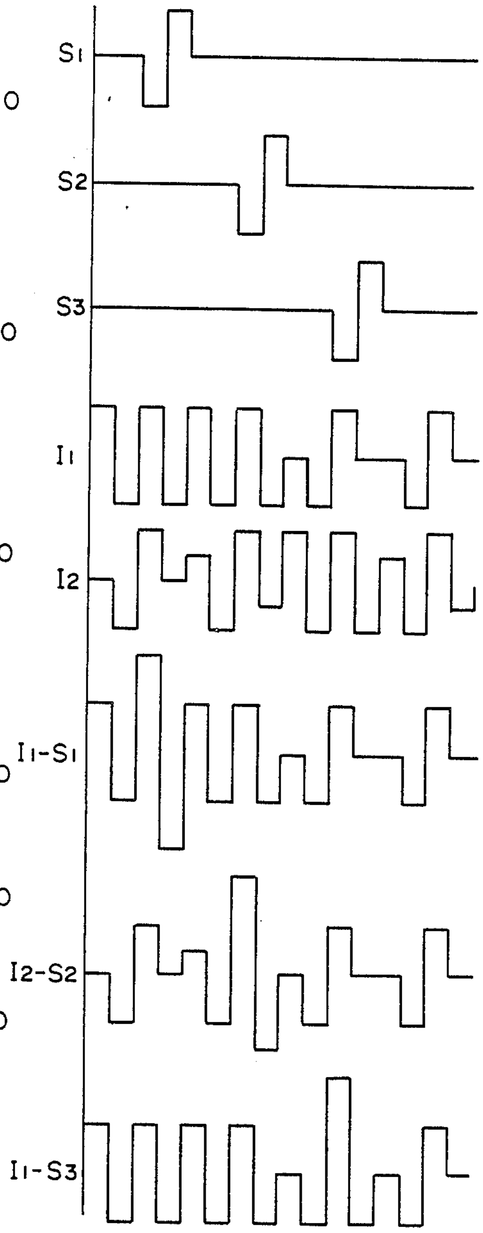

FIGS. 13(*a*), 13(*b*), 14(*a*) and 14(*b*) show a driving method for an optical modulation device, which comprises: applying to a selected scanning electrode a scanning selection signal comprising a voltage of one polarity and a voltage of the other polarity respectively with respect to the voltage level of a nonselected scanning electrode, and also a same level voltage which is at the same voltage level as that of the non-selected scanning electrode; applying to a selected signal electrode an information signal comprising a first voltage signal providing a voltage exceeding the first threshold voltage of the optical modulation material in synchronism with the voltage of one polarity, a second voltage signal providing a voltage exceeding the second threshold voltage of the optical modulation material in synchronism with the voltage of the other polarity, and a third voltage signal which provides a voltage not exceeding the first or second threshold voltage of the optical modulation material in synchronism with the same level voltage and is a voltage signal of the same polarity as the first voltage signal with respect to the voltage level of the nonselected scanning electrode; and applying to another signal electrode an information signal comprising a fourth voltage signal providing a voltage exceeding the first threshold voltage of the optical modulation material in synchronism with the voltage of one polarity, a fifth voltage signal which is at the same level as the voltage level of the nonselected scanning electrode in synchronism with the voltage of the other polarity, and a sixth voltage signal which is at the same level as the same level voltage in synchronism with the same level voltage.

More specifically, FIGS. 13(*a*) and 13(*b*) show an exemplary set of driving waveforms for effecting image-erasure and writing sequentially and line by line, and the resultant picture corresponds to one shown in FIG. 2.

FIG. 13(*a*) shows voltage signal waveforms applied to respective scanning electrodes $S_S$, $S_{NS}$ and respective signal electrodes $I_S$, $I_{HS}$, $I_{NS}$ and voltages applied to the liquid crystal at respective pixels sandwiched between the scanning electrodes and signal electrode. In the figure, the abscissa and the ordinate represent time and voltage, respectively, as in FIGS. 3(*a*) and (*b*).

A driving waveform $S_S$ is applied to a selected scanning electrode, i.e., a line on which image information is written, and a driving waveform $S_{NS}$ is applied at that time to a nonselected scanning electrode, i.e., a line on which image information is not written. On the other hand, a driving waveform $I_S$ is applied to a signal electrode on which an intersection with the selected line is to be written into "black". Similarly, driving waveforms $I_{HS}$ and $I_{NS}$ are applied for writing an intermediate level and "white", respectively.

At this time, the liquid crystal constituting pixels is supplied with voltages shown at $I_S$–$S_S$, $I_{HS}$–$S_S$, $I_{NS}$–$S_S$, $I_S$–$S_{NS}$, $I_{HS}$–$S_{NS}$ and $I_{NS}$–$S_{NS}$, respectively.

At this time, the driving voltage $V_0$ is similarly selected to satisfy the relationship of $|\pm 2\ V_0| < |V_{th}| < |\pm 3\ V_0|$ wherein the inversion threshold voltage $V_{th}$ of the bistable ferroelectric liquid crystal used is assumed to have the same magnitude absolute value on the negative side ($+V_{th}$) and on the negative side ($-V_{th}$) as in the embodiment of FIG. 3.

The respective waveforms will now be explained in more detail. The scanning selection signal $S_S$ applied to a selected scanning electrode comprises 4 phases in one writing period, among which line erasure is effected at the third phase and writing into pixels is effected depending on signals applied to signal electrodes at the fourth phase. For this purpose, pulse voltages of $-2\ V_0$ and $+2\ V_0$ are applied at the third and fourth phases, respectively. Further, voltage signals applied at the first and second phase are held at substantially zero (reference potential). The reference potential is the same level as the voltage level applied to a scanning electrode at the time of nonselection. On the other hand, a nonselected scanning electrode is fixed at the reference potential, 0 volt in this embodiment.

Then, with respect to the voltage waveforms applied to the signal electrodes in substantial synchronism with the respective phases of the scanning selection signal, an erasure signal of $+2\ V_0$ is applied at the third phase wherein a voltage of $4\ V_0$ exceeding the inversion threshold voltage of the liquid crystal is applied between the selected scanning electrode $S_S$ and the respective signal electrodes, so that the whole line is inverted to the erasure side (white). Next, at the fourth phase, the signal electrodes intersecting with the selected scanning electrode are supplied with voltage signals respectively corresponding to given gradation data. Herein, it is assumed that a potential or voltage signal of $-2\ V_0$ is applied for providing "black" to a pixel, a potential of $-V_0$ is applied for providing an intermediate level ("gray") and a potential of 0 is applied for retaining "white" as it is. As a result, voltages of $-4\ V_0$, $-3\ V_0$ and $-2\ V_0$, respectively, are applied to the pixels on the line, which are written into "black", an intermediate level and "white", respectively.

With respect to the supplemental or auxiliary first and second phases, at the second phase, the pixels on the selected scanning electrode are supplied with a voltage of $-2\ V_0$ which is below the threshold voltage irrespective of writing signals. At the first phase, a voltage signal is applied corresponding to the pixel-writing signal applied at the fourth phase. More specifically, the voltage signal is preferably one which is zero (reference potential) or a voltage of a polarity opposite to that of the voltage signal applied to the signal electrode at the fourth phase and which has the same magnitude as the voltage signal applied at the fourth phase. Thus, voltage signals of $+2\ V_0$, $+V_0$ and zero are applied corresponding to voltage signals of $-2\ V_0$, $-V_0$ and zero, respectively, applied at the fourth phase. As a result, the pixels on the selected scanning electrode are supplied with voltages of $2\ V_0$, $V_0$ and zero at the first phase. Thus, these voltages applied at the first phase are all below the threshold voltage $V_{th}$ and have a polarity for orienting the pixels toward "white" (i.e., the opposite polarity to the voltages applied at the fourth phase), so that no pixels are inverted toward "black". As a result, no flickering is caused on a pixture before the pixels on a scanning line is uniformly brought to "white" at the third phase.

At the second phase, the pixels on the selected scanning electrode are below the threshold voltage and constant ($-2\ V_0$).

Further, the pixels formed at the intersections of a nonselected scanning electrode and respective signal electrodes $I_S$, $I_{HS}$ and $I_{NS}$ are supplied with voltages as shown in FIG. 13(*a*).

FIG. 13(*b*) show driving voltage waveforms applied time serially to scanning electrodes $S_1$, $S_2$, $S_3$, signal electrodes $I_1$, $I_2$ and pixels formed at these intersections. By applying these driving waveforms sequentially, a picture frame as shown in FIG. 2 is formed.

In the driving embodiment shown in FIG. 13, voltages applied in respective phases are selected to be zero or to have one polarity and voltages applied in consecutive phases are selected to have opposite polarities. As a result, an adjacent pair of voltages having the same polarity have a voltage of zero or the opposite polarity therebetween, so that a pixel is not supplied with a voltage of the same polarity consecutively. Furthermore, the driving waveforms can be constituted so that the total of the voltages assume substantially zero, whereby the problem of crosstalk can be solved.

Further, in the above embodiment, the auxiliary signal applied at the first phase is set to be a voltage signal having the same magnitude as and the opposite polarity to the pixel state determining voltage signal applied at the fourth phase, so that the auxiliary signal can be easily provided by inverting the level signal for writing a pixel applied at the fourth phase by means of an analog or digital inverter. As a result, the electrical circuit for driving can be simply constituted and does not require a complicated arithmetic circuit.

In the above explanation, a display of three level image has been explained. However, a multi-level or analog gradation image can be obtained by changing the voltage levels of voltage signals applied to signal electrodes at the fourth phase from $-2\ V_0$ to zero and correspondingly changing the voltage levels of voltage signals applied to signal electrodes at the first phase from $+2\ V_0$ to zero, respectively, in multi-levels or continuously.

Figure 14A:
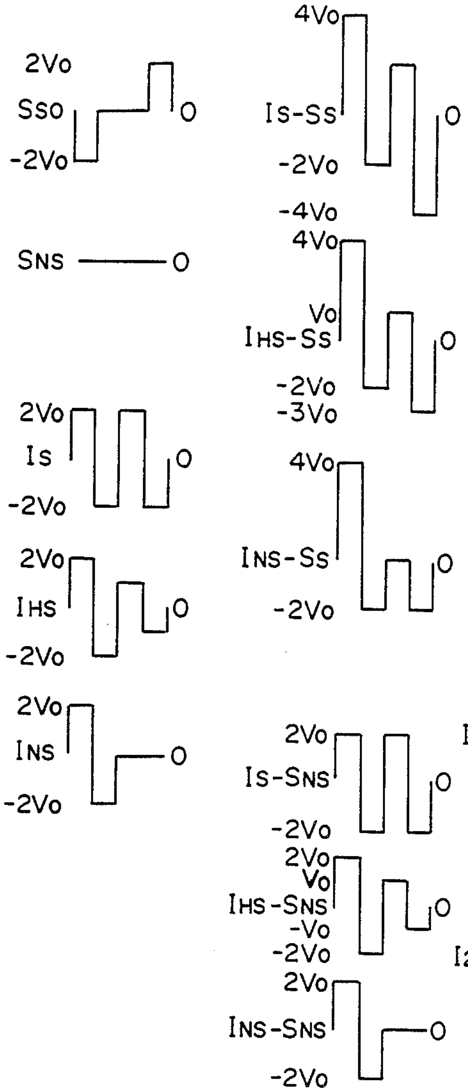
Figure 14B:
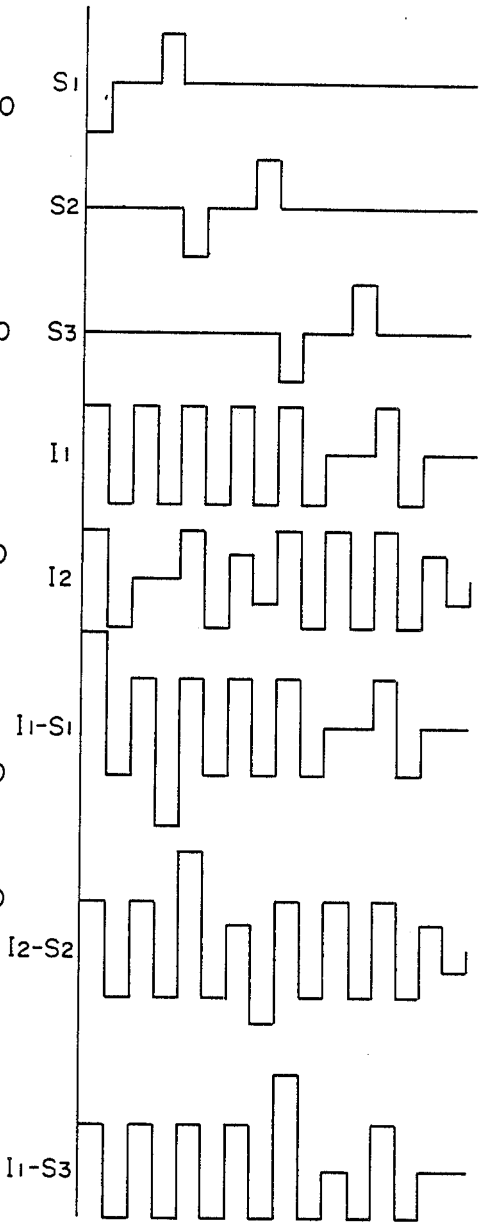

FIGS. 14(*a*) and 14(*b*) show another preferred driving embodiment by which a good image free of flickering and crosstalk can be formed.

Figure 15A:
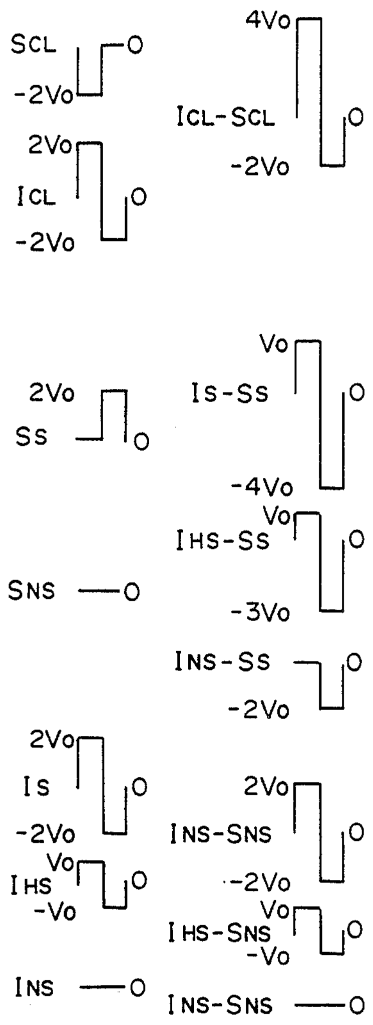
Figure 15B:
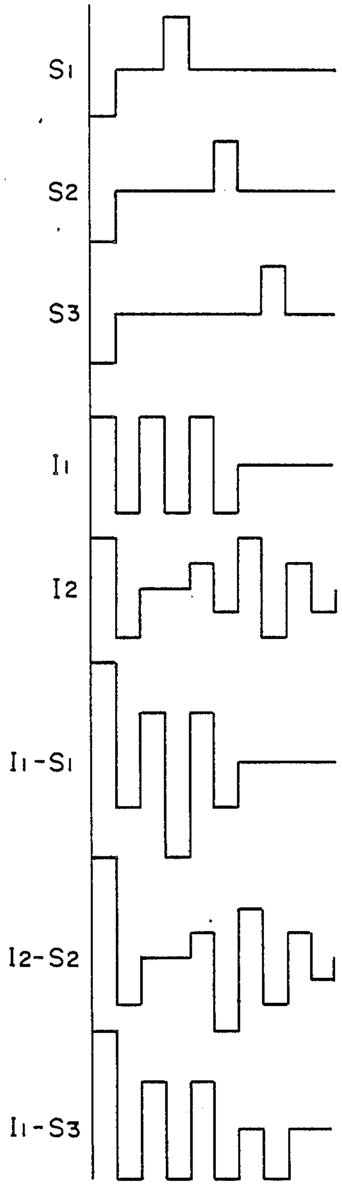

FIGS. 15(*a*) and 15(*b*) show a driving method for an optical modulation device, which comprises:

in a first step) applying a voltage signal to all or a prescribed number of scanning electrodes, the voltage signal comprising a voltage of one polarity with respect to the voltage level of a nonselected scanning electrode and a same level voltage which is at the same level as that of the non-selected scanning electrode, and applying, to all or a prescribed number of signal electrodes, a voltage signal providing a voltage exceeding the first threshold voltage of the optical modulation material in synchronism with the voltage of one polarity and a voltage signal providing a voltage not exceeding the first or second threshold voltage of the optical modulation material in synchronism with the same level voltage; and in a second step) applying to a selected scanning electrode a scanning selection signal comprising a voltage of the other polarity with respect to the voltage level of a nonselected scanning electrode and a same level voltage which is at the same level as that of the nonselected scanning electrode; applying to a selected signal electrode an information signal comprising a voltage signal providing a voltage exceeding the second threshold voltage of the optical modulation material in synchronism with the voltage of the other polarity and a voltage signal providing a voltage not exceeding the first or second threshold voltage of the optical modulation material in synchronism with the same level voltage; and applying to another signal electrode a voltage signal providing a voltage not exceeding the first or second threshold voltage of the optical modulation material in synchronism with the voltage of the other polarity and the same level voltage, respectively.

More specifically, FIG. 15(*a*) shows an exemplary set of driving waveforms for areal erasure of the whole area on a block and then writing an image in the erased area line by line.

Referring to FIG. 15(*a*), at the time of the areal erasure of the whole area or a block area comprising a prescribed number of scanning electrodes, a signal $S_{CL}$ is applied to the related scanning electrodes for erasing the pixels concerned uniformly into "white", and an $I_{CL}$ is applied to the related signal electrodes in synchronism therewith, whereby the pixels are supplied with a voltage as shown at $I_{CL}$–$S_{CL}$. Herein, the inversion threshold of the bistable ferroelectric liquid crystal used is assumed to be the same as in the embodiment of FIG. 13. As a result, at the time of the areal erasure, the pixels are supplied with a voltage of 4 $V_0$ to be uniformly brought to "white". The pixels are thereafter supplied with a voltage of $-2$ $V_0$ at the second phase but are not changed because the voltage is below the threshold voltage $V_{th}$.

Then, image information is given line by line. More specifically, a selected scanning electrode is supplied with a driving waveform $S_S$ comprising zero (reference potential) at the first phase and $+2$ $V_0$ at the second phase. Further, a nonselected is held at zero (reference potential) both at the first and second phases as shown at $S_{NS}$. On the other hand, the respective signal electrodes are supplied with a pixel state-determining signal at the second phase and a signal of a potential which has the same magnitude as and the opposite polarity to the pixel state-determining signal (zero when the potential at the second phase is zero (reference potential)). More specifically, a signal $I_S$ for writing "black" comprises $-2$ $V_0$ at the second phase and $+2$ $V_0$ at the first phase; a signal $I_{HS}$ for writing an intermediate level comprises $-V_0$ at the second phase and $+V_0$ at the first phase; and a signal $I_{NS}$ for retaining "white" comprises zero (reference potential) at both the second and first phases. As a result, the respective pixels are supplied with voltages shown at $I_S$–$S_S$, $I_{HS}$–$S_S$ and $I_{NS}$–$S_S$, respectively, including a voltage of $-4$ $V_0$ for writing "black", $-3$ $V_0$ for writing an intermediate level, and $-2$ $V_0$ for retaining "white", respectively, at the second phase, whereby their pixels states are determined. On the other hand, the voltages applied at the first phase have the opposite polarity to those applied at the second phase or zero, so that they do not cause inversion toward "black" side. Further, the pixels on a nonselected scanning electrode are supplied with voltage waveforms $I_S$–$S_{NS}$, $I_{HS}$–$S_{NS}$ and $I_{NS}S_{NS}$ $S_{NS}$ which are substantially the same as $I_S$, $I_{HS}$ and $I_{NS}$, respectively, only to retain their previous written states.

Also in this embodiment, voltages applied in respective phases are selected to be zero or to have one polarity and voltages applied in consecutive phases are selected to have opposite polarities. As a result, an adjacent pair of voltages having the same polarity have a voltage of zero or the opposite polarity therebetween, so that a pixel is not supplied with a voltage of the same polarity consecutively.

Further, in the embodiment shown in FIG. 15, the driving waveforms are so constituted that the total of the voltages applied during the areal erasure and the voltages applied during the writing assumes zero, and the voltages applied during the time of nonselection assumes zero. As a result, even in a long period of driving of the device, no DC component remains so that any difficulties accompanying such DC component are totally removed.

In this embodiment, a multi-level or analog gradational display may well be effected by changing the magnitudes of signals applied to the signal electrodes at multi-levels or continuously.

As described above, according to the present invention, a good gradational display may be provided while effectively avoiding crosstalk.

As an optical modulation material used in a driving method according to the present invention, a material showing at least two stable states, particularly one showing either a first optically stable state or a second optically stable state depending upon an electric field applied thereto, i.e., bistability with respect to the applied electric field, particularly a liquid crystal having the above-mentioned property, may suitably be used.

Preferable liquid crystals having bistability which can be used in the driving method according to the present invention are chiral smectic liquid crystals having ferroelectricity. Among them, chiral smectic C (SmC*)- or H (SmH*)-phase liquid crystals are suitable therefor. These ferroelectric liquid crystals are described in, e.g., "LE JOURNAL DE PHYSIQUE LETTERS", 36 (L-69), 1975 "Ferroelectric Liquid Crystals"; "Applied Physics Letters" 36 (11) 1980, "Submicro Second Bistable Electrooptic Switching in Liquid Crystals"; "Kotai Butsuri (Solid State Physics)" 16 (141), 1981 "Liquid Crystal", U.S. Pat. Nos. 4,561,726, 4,589,996, 4,592,858, 4,596,667, 4,613,209, 4,614,609 and 4,622,165, etc. Ferroelectric liquid crystals disclosed in these publications may be used in the present invention.

More particularly, examples of ferroelectric liquid crystal compound used in the method according to the present invention include decyloxybenzylidene-p'-amino-2-methylbutylcinnamate (DOBAMBC), hexyloxybenzylidene-p'-amino—2-chloropropylcinnamate (HOBACPC), 4-O-(2-methyl)-butylresorcylidene-4'-octylaniline (MBRA8), etc.

When a device is constituted by using these materials, the device can be supported with a block of copper, etc., in which a heater is embedded in order to realize a temperature condition where the liquid crystal compounds assume an SmC*- or SmH*-phase.

Further, a ferroelectric liquid crystal formed in chiral smectic F phase, I phase, J phase, G phase or K phase may also be used in addition to those in SmC* or SmH* phase in the present invention.

Figure 16:
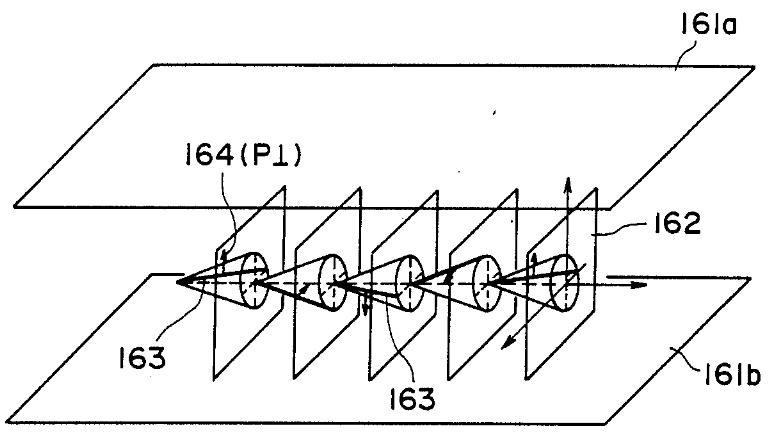
FIGS. 16 and 17 are respectively a schematic perspective view of a ferroelectric liquid crystal device used in the present invention.
Figure 17:
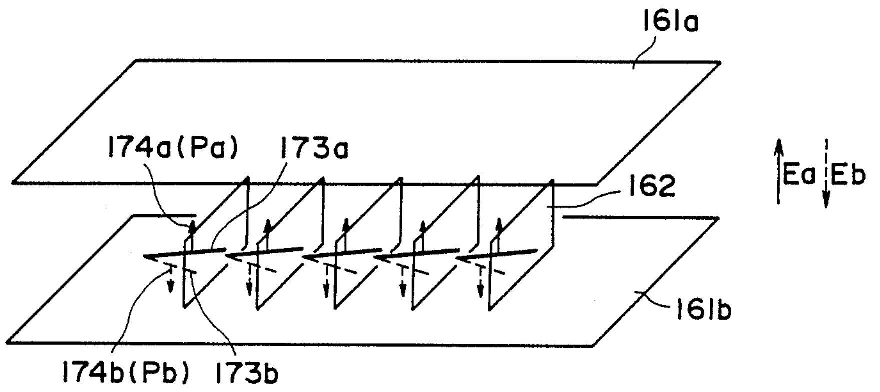
Figure 18:
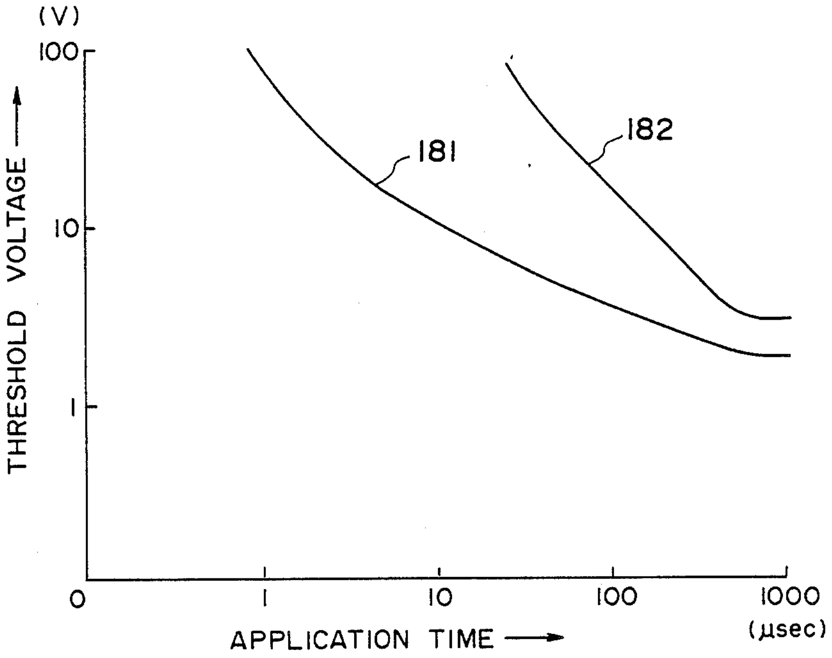
FIG. 18 shows characteristic curves of ferroelectric liquid crystals showing the dependency of a threshold voltage on a voltage application time.

Referring to FIG. 16, there is schematically illustrated an example of a ferroelectric liquid crystal cell to explain the basic operation principle of such a cell. Reference numerals 116*a* and 116*b* denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 162 are oriented perpendicular to surfaces of the glass plates is hermetically disposed therebetween. A full line 163 shows liquid crystal molecules. Each liquid crystal molecule 163 has a dipole moment ($P_\perp$) 164 in a direction perpendicular to the axis thereof. When a voltage higher than a certain threshold level is applied between electrodes formed on the substances 161*a* and 161*b*, a helical structure of the liquid crystal molecule 163 is unwound or released to change the alignment direction of respective liquid crystal molecules 163 so that the dipole moments ($P_\perp$) 164 are all directed in the direction of the electric field. The liquid crystal molecules 163 have an elongated shape and show refractive anisotropy between the long axis and the short axis thereof. Accordingly, it is easily understood that when, for instance, polarizers arranged in a cross nicol relationship, i.e., with their polarizing directions being crossing each other, are disposed on the upper and the lower surfaces of the glass plates, the liquid crystal cell thus arranged functions as a liquid crystal optical modulation device of which optical characteristics such as contrast vary depending upon the polarity of an applied voltage. Further, when the thickness of the liquid crystal cell is sufficiently thin (e.g., 1 micron), the helical structure of the liquid crystal molecules is unwound without application of an electric field whereby the dipole moment assumes either of the two states, i.e., Pa in an upper direction 174a or Pb in a lower direction 174b as shown in FIG. 17. When electric field Ea or Eb higher than a certain threshold level and different from each other in polarity as shown in FIG. 17 is applied to a cell having the above-mentioned characteristics, the dipole moment is directed either in the upper direction 174a or in the lower direction 174b depending on the vector of the electric field Ea or Eb. In correspondence with this, the liquid crystal molecules are oriented to either of a first stable state 33a and a second stable state 173b.

When the above-mentioned ferroelectric liquid crystal is used as an optical modulation device, it is possible to obtain two advantages. First is that the response speed is quite fast. Second is that the orientation of the liquid crystal shows bistability. The second advantage will be further explained, e.g., with reference to FIG. 17. When the electric field Ea is applied to the liquid crystal molecules, they are oriented to the first stable state 173a. This state is stably retained even if the electric field is removed. On the other hand, when the electric field Eb of which direction is opposite to that pf the electric field Ea is applied thereto, the liquid crystal molecules are oriented to the second stable state 173b, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, particularly 1 to 5 microns.

What is claimed is:

1. A driving method for an optical modulation device comprising a group of scanning electrodes, a group of signal electrodes disposed to intersect with the group of scanning electrodes, and a ferroelectric liquid crystal, having first and second threshold voltages, disposed between the group of scanning electrodes and the group of signal electrodes so as to form a pixel at each intersection, the driving method comprising the steps of:

applying a selection signal to a selected scanning electrode of the group of scanning electrodes and a non-selection signal to at least one non-selected scanning electrode of the group of scanning electrodes, wherein the non-selection signal comprises a non-scanning voltage signal applied at a predetermined level, and wherein the selection scanning signal comprises a first scanning voltage signal applied at one polarity with respect to the non-scanning voltage signal, a second scanning voltage signal applied at a polarity opposite to the one polarity and a third scanning voltage signal applied at the predetermined level, and applying an information signal to a signal electrode of the group of signal electrodes, wherein the information signal comprises first, second and third information voltage signals, wherein the first information voltage signal is applied in synchronism with the first scanning voltage signal and, in combination therewith, provides a voltage sufficient to erase a corresponding one of the pixels on the selected scanning electrode, wherein the second information voltage signal is selectively applied at a first selected level of either zero or a polarity opposite to that of the second scanning voltage signal in correspondence to a predetermined gradation in synchronism with the second scanning voltage signal, and wherein the third information voltage signal is applied, at a second selected level in synchronism with the third scanning voltage signal such that an average of the levels of the first, second and third information voltage signals is substantially equal to the predetermined level of the non-scanning voltage signal.

2. A method according to claim 1, wherein the first and second scanning voltage signals are each applied for a predetermined duration and the third scanning voltage signal is applied for a duration substantially equal to twice the predetermined duration, wherein the information signal further comprises a fourth information voltage signal applied at the predetermined level, and wherein the third and fourth information voltage signals are each successively applied for the predetermined duration in synchronism with the third scanning voltage signal.

3. A method according to claim 1, wherein the ferroelectric liquid crystal comprises a chiral smectic liquid crystal.

4. A method according to claim 3, wherein the chiral smectic liquid crystal is disposed in a layer thin enough to release its own helical structure in the absence of an electric field.

5. An optical modulation apparatus comprising:

an optical modulation device comprising a group of scanning electrodes, a group of signal electrodes disposed to intersect with the group of scanning electrodes, and a ferroelectric liquid crystal having first and second threshold voltages disposed between the group of scanning electrodes and the group of signal electrodes so as to form a pixel at each intersection; and a driving means for applying a selection signal to a selected scanning electrode of the group of scanning electrodes, a non-selection signal to at least one non-selected scanning electrode of the group of scanning electrodes, and an information signal to a signal electrode of the group of signal electrodes, wherein the non-selection signal comprises a non-scanning voltage signal applied at a predetermined level, wherein the selection scanning signal comprises a first scanning voltage signal applied at one polarity with respect to the non-scanning voltage signal, a second scanning voltage signal applied at a polarity opposite to the one polarity and a third scanning voltage signal applied at the predetermined level, wherein the information signal comprises first, second and third information voltage signals, wherein the first information voltage signal is applied in synchronism with the first scanning voltage signal and, in combination therewith, provides a voltage sufficient to erase a corresponding one of the pixels on the selected scanning electrode, wherein the second information voltage signal is selectively applied at a first selected level of either zero or a polarity opposite to that of the second scanning voltage signal in correspondence to a predetermined gradation in synchronism with the second scanning voltage signal, and wherein the third information voltage signal is applied, and at a second selected level in synchronism with the third scanning voltage signal such that an average of the levels of the first, second and third information voltage signals is substantially equal to the predetermined level of the non-scanning voltage signal.

6. An apparatus according to claim 5, wherein the first and second scanning voltage signals are each applied for a predetermined duration and the third scanning voltage signal is applied for a duration substantially equal to twice the predetermined duration, wherein the information signal further comprises a fourth information voltage signal applied at the predetermined level, and wherein the third and fourth information voltage signals are each successively applied for the predetermined duration in synchronism with the third scanning voltage signal.

7. An apparatus according to claim 5, wherein said ferroelectric liquid crystal comprises a chiral smectic liquid crystal.

8. An apparatus according to claim 7, wherein said chiral smectic liquid crystal is disposed in a

* * * * *

UNITED STATES PATENT AND TRADEMARK OFFICE

CERTIFICATE OF CORRECTION

PATENT NO. : 4,938,574
DATED : July 3, 1990
INVENTOR(S) : SHUZO KANEKO ET AL.

It is certified that error appears in the above-identified patent and that said Letters Patent is hereby corrected as shown below:

Item [54] TITLE Page, col. 1, line 4,

"GRADIATIONAL" should read -- GRADATIONAL--.

COLUMN 1

Line 4, "GRADIATIONAL" should read --GRADATIONAL--

COLUMN 2

Line 42, "electrodes;" should read --electrode;--.
Line 49, "electrodes;" should read --electrode;--.
Line 51, "electrodes" should read --electrode--.

COLUMN 3

Line 49, "pixels;" should read --pixels--.
Line 59, "electrodes" should read --electrode--.

COLUMN 4

Line 5, "electrodes" should read --electrode--.

COLUMN 5

Line 7, "thin" should read --this--.
Line 59, "as" should be deleted.

COLUMN 6

Line 6, "corresponding" should read --correspondingly--.
Line 8, "on" should read --or--.
Line 42, "FIG. 3(a)" should read --FIGS. 3(a)--.
Line 61, "negative" should read --positive--. (1st occurrence)

UNITED STATES PATENT AND TRADEMARK OFFICE

CERTIFICATE OF CORRECTION

PATENT NO. : 4,938,574

DATED : July 3, 1990

INVENTOR(S) : SHUZO KANEKO ET AL.

It is certified that error appears in the above-identified patent and that said Letters Patent is hereby corrected as shown below:

COLUMN 7

Figure 4A:
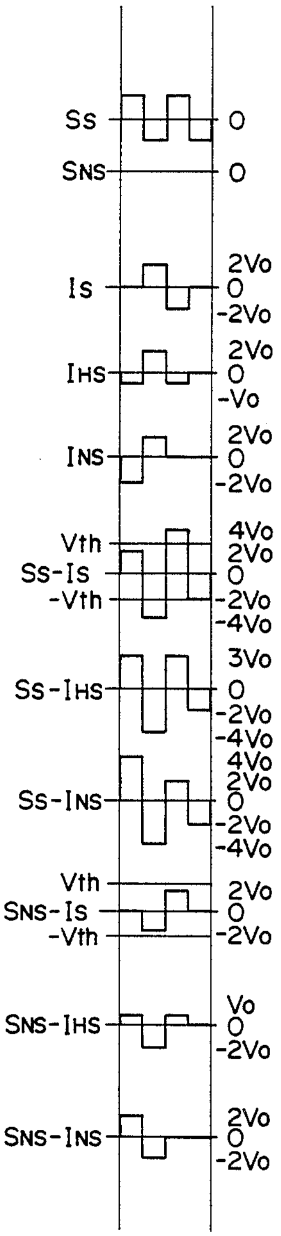

Line 15, "FIG. 4(a)" should read --FIG. 4(a))--.

COLUMN 8

Figure 4B:
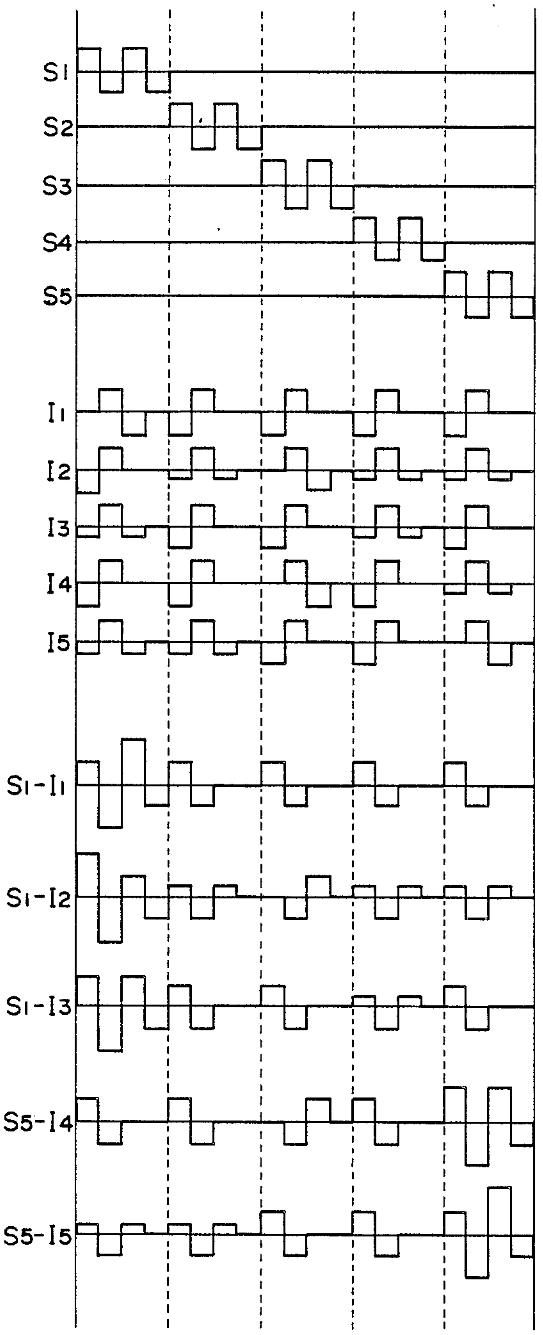

Line 19, "FIGS. 4 or 5." should read --FIGS. 4(a), 4(b), 5(a) and 5(b).--.
Line 58, ""white";" should read --"white",--.
Line 60, "$B_2$" should read --$A_3$--.

COLUMN 9

Line 6, "formed" should read --formed by--.
Line 11, "embodiment of FIGS. 4 and 5," should read --embodiments of FIGS. 4(a), 4(b), 5(a) and 5(b),--.
Line 51, "whole are" should read --the whole area--.

COLUMN 10

Line 26, "negative" should read --positive--.
Line 28, "FIG. 3" should read --FIGS. 3(a) and 3(b)--.
Line 30, "voltages" should read --voltage--.

COLUMN 11

Line 3, "FIGS. 8(a) and 9(b)." should read --FIGS. 8, 9(a) and 9(b).--.
Line 4, "FIG." to --FIGS.--.

UNITED STATES PATENT AND TRADEMARK OFFICE
CERTIFICATE OF CORRECTION

PATENT NO. : 4,938,574

DATED : July 3, 1990

INVENTOR(S) : SHUZO KANEKO ET AL.

It is certified that error appears in the above-identified patent and that said Letters Patent is hereby corrected as shown below:

COLUMN 12

Line 54, "negative" should read --positive--.
Line 55, "FIG. 3." should read --FIGS. 3(a) and 3(b).--.
Line 65, "phase" should read --phases--.

COLUMN 13

Line 45, "on a pixture" should be deleted.
Line 46, "is" should read --are--.
Line 60, "FIG. 13," should read --FIG. 13(b),--.

COLUMN 15

Line 18, "nonselected" should read --nonselected scanning electrode--.
Line 44, "$I_{NS}S_{NS}S_{NS}$" should read --$I_{NS}$-$S_{NS}$--.
Line 56, "FIG. 15," should read --FIG. 15(a),--.

COLUMN 16

Line 18, "LETTERS"," should read --LETTRES",--.
Line 46, "116a and 116b" should read --161a and 161b--.
Line 54, $(P_1)$" should read --$(P_\perp)$--.
Line 57, "substances" should read --substrates--.
Line 61, "$(P_1)$" should read --$(P_\perp)$--.
Line 67, "being" should be deleted.

COLUMN 17

Line 19, "state 33a" should read --state 173a--.
Line 30, "pf" should read --of--.

UNITED STATES PATENT AND TRADEMARK OFFICE

CERTIFICATE OF CORRECTION

PATENT NO. : 4,938,574

DATED : July 3, 1990

INVENTOR(S) : SHUZO KANEKO ET AL.

It is certified that error appears in the above-identified patent and that said Letters Patent is hereby corrected as shown below:

COLUMN 18

Line 14, "such" should read --so--.

COLUMN 19

Line 7, "applied, and" should read --applied--.
Line 8, "¶ at" should read --at--.
Line 9, "such" should read --so--.

COLUMN 20

Line 15, "in a" should read --in a layer thin enough to release its own helical structure in the absence of an electric field.--.

Signed and Sealed this

Twenty-first Day of December, 1993

Attest:

BRUCE LEHMAN

Attesting Officer

Commissioner of Patents and Trademarks